United States Patent [19]
Ferrera et al.

[11] Patent Number: 5,666,926
[45] Date of Patent: Sep. 16, 1997

[54] INTERNAL COMBUSTION ENGINE WITH METHANE INJECTION SYSTEM

[75] Inventors: Massimo Ferrera; Pietro Gianotti; Marco Mauro; Riccardo Gozzelino; Filippo Audisio; Gianpiero Borello, all of Orbassano, Italy

[73] Assignee: Centro Ricerche Fiat Societa' Consortile per Azioni, Orebassano, Italy

[21] Appl. No.: 611,476

[22] Filed: Mar. 5, 1996

[51] Int. Cl.⁶ .................................................. F02M 21/02
[52] U.S. Cl. ..................... 123/525; 123/575; 123/27 GE
[58] Field of Search .................................. 123/525, 526, 123/527, 575, 27 GE

[56] References Cited

U.S. PATENT DOCUMENTS

| | | | |
|---|---|---|---|
| 5,228,423 | 7/1993 | Oitawa | 123/575 |
| 5,325,838 | 7/1994 | Bennett | 123/527 |
| 5,329,908 | 7/1994 | Tarr et al. | 123/527 |
| 5,373,824 | 12/1994 | Peters et al. | 123/527 |
| 5,377,645 | 1/1995 | Moore | 123/514 |
| 5,487,362 | 1/1996 | Welleu et al. | 123/526 |
| 5,522,369 | 6/1996 | Povinger | 123/527 |
| 5,526,797 | 6/1996 | Stokes | 123/575 |

*Primary Examiner*—Erick R. Solis
*Attorney, Agent, or Firm*—Sughrue, Mion, Zinn, Macpeak & Seas

[57] ABSTRACT

An internal combustion engine is provided with a methane feed system including a plurality of methane injection devices respectively associated with the various cylinders of the engine. The methane injection devices are mounted within respective seats communicating with a distributing conduit or rail for feeding methane. The seats for the injection devices in the rail are formed in an auxiliary body separate from the intake manifold and the head of the engine. An electronic control unit provides for the control of the injection devices on the basis of signals indicative of the parameters of operation of the engine so as to carry out the methane injection at each cylinder when the rotational speed of the engine is lower than a predetermined threshold when the intake valve of the cylinder is open.

9 Claims, 10 Drawing Sheets

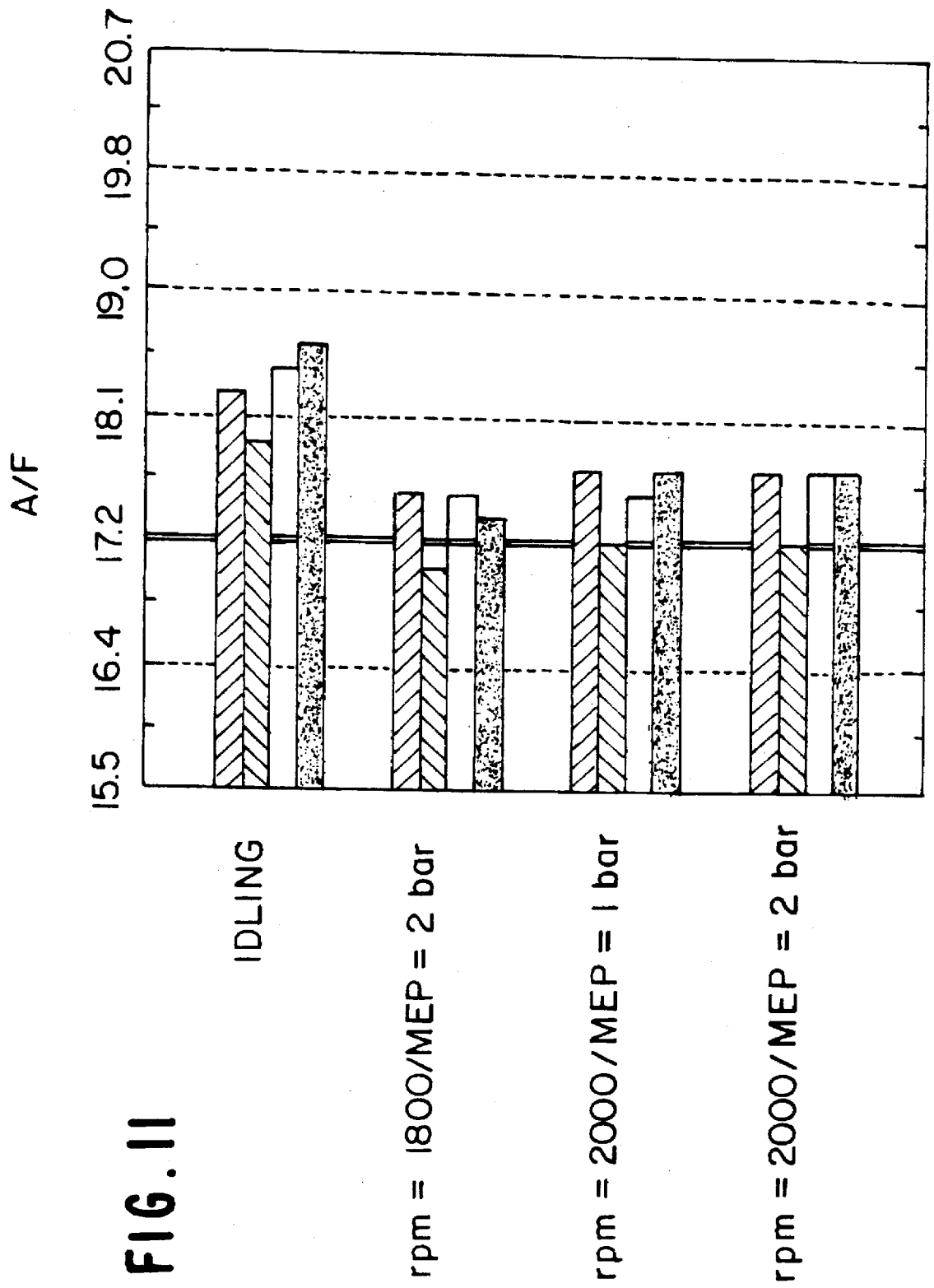

INTERNAL COMBUSTION ENGINE WITH METHANE INJECTION SYSTEM

BACKGROUND OF THE INVENTION

The present invention relates to the field of internal combustion engines with methane injection system.

The increasingly strict limitations posed by laws on the noxious emissions from internal combustion engines have originated new interest by manufacturers in engines with methane feed.

According to the conventional art, methane engines are provided with a choke device for metering the methane to be mixed with the air fed to the engine, according to an arrangement similar to that of a usual carburettor of a gasoline engine. However, this solution is no longer acceptable since it cannot be used in conjunction with an electronic system for controlling the operation of the engine which is able in particular to control the metering as a function of the composition of the exhaust gasses as detected by a so called lambda probe.

Therefore, it would be desirable to provide an engine fed by methane having an injection feed system.

A further problem lies in the need of adapting a gasoline injection engine or a diesel engine so that they can be fed by methane. It is to be noted that because of the gaseous state of the methane, the volumes involved are about ten times greater than those of a gasoline injection system or an injection system of a diesel engine. This means that an injection device for the injection of methane is of a size much greater than an injection device for gasoline or diesel fuel. As a consequence of this, the structure of a gasoline injection engine or a diesel engine cannot be immediately used for the injection of methane. In particular, the seats of the injection devices of a gasoline engine or a diesel engine are too small for receiving the methane injection devices. On the other hand, it would be desirable to transform a gasoline or diesel engine into a methane engine with no modification to the structure and geometry of the engine.

The object of the present invention is that of solving satisfactorily all the above mentioned problems while providing in particular a methane injection engine starting from a gasoline injection engine or a diesel engine with no substantial modification to the structure of the engine.

Another problem which is encountered in methane fed engines is the following.

In the above indicated engines, a basic operation parameter for ensuring regular operation in terms of homogeneous distribution of the air/methane mixture cylinder by cylinder is constituted by the timing in which injection begins.

In conventional engines with direct gasoline injection, the injection device associated with each cylinder is controlled for carrying out the gasoline injection when the intake valve of the associated cylinder is still closed. This is done to allow to the gasoline the time for mixing with air (flight time) before entering into the cylinder.

Studies and tests conducted by the applicant have shown that with internal combustion engines where methane is fed by injection cylinder by cylinder (multi-point injection) the above mentioned way of operation is an origin of drawbacks. Indeed, given that methane is injected into the intake conduit of each engine cylinder in a gaseous state, it occupies a volume greater at least by two hundreds times that of an equal mass of gasoline injected in a liquid state. This implies that if the methane is injected into a cylinder when the intake valve is closed, it can be sucked in the conduit of another cylinder that during this stage has its intake valve opened. The low inertia of a gas with respect to a liquid and the volume occupied within the conduit are the main reasons for which the above mentioned phenomenon takes place if a gas is injected and does not take place if a liquid is injected. This re-flow phenomenon implies a misdistribution of the air/methane mixture cylinder by cylinder and therefore a fluctuation of the concentration of unburned gasses (in particular carbon monoxide and oxygen) in the exhaust gasses, which prevents a feedback control by a lambda probe or the composition of the exhaust gasses in order to improve the efficiency of the catalytic converter.

A further object of the invention is that of solving this drawback.

SUMMARY OF THE INVENTION

In view of achieving the above mentioned objects, the present invention provides an internal combustion engine with a methane feed system, characterized in that it is provided with a plurality of methane injection devices respectively associated with the various cylinders of the engine and mounted within respective seats communicated to a distributing conduit or rail for feeding methane, and in that the seats for the injection devices and said rail are formed in an auxiliary body separate from the intake manifold and the head of the engine, said engine being further characterized in that it comprises an electronic control unit which provides for controlling the injection devices on the basis of signals indicative of the parameters of operation of the engine so as to carry out the methane injection at each cylinder, at least when the rotational speed of the engine is lower than a predetermined threshold, with the intake valve of said cylinder which is already opened. In the typical case in which the opening of the intake valve takes place some time in advance with respect to the reaching of the top dead center by the piston within the cylinder, the injection can be carried out at said top dead center.

Due to said features, the engine according to the invention is able to overcome the above indicated drawbacks, while ensuring a substantially uniform distribution of the air/methane mixture in the various cylinders of the engine.

The methane engine according to the invention can be obtained starting from a gasoline injection engine or a diesel engine by the addition of the above mentioned auxiliary body.

In the case of a gasoline injection engine, said auxiliary body has a plurality of projections through which outlet holes for the methane are formed which are aligned with said seats for the injection devices, said projections being fitted within corresponding seats originally provided in the intake manifold for receiving the gasoline injection devices.

In the case instead of a transformation of a diesel engine, said auxiliary body is interposed between the intake manifold and the engine head and conduits for passage of the air fed to the engine are formed through it which communicate the cooperating conduits formed in the intake manifold and in the engine head, said auxiliary body further having a plurality of methane outlet holes which are aligned with the respective seats for the injection devices and respectively communicate with said air conduits which are formed in the auxiliary body. In this case, the diesel engine must be further preliminarly adapted with a spark ignition system, by mounting ignition spark plugs within the seats originally provided for the diesel fuel injectors.

Due to these features, the engine according to the invention may be obtained simply with the addition of the said auxiliary body, which fulfils the function of an adaptor able to allow the use of methane injection devices with no modification to the structure of the head and the intake manifold of the gasoline engine or the diesel engine.

In a variant, which allows the engine to operate either with methane or with gasoline, for each cylinder of the engine there is provided an adaptor member provided both with a seat for a gasoline injector and with a seat for a methane injector, said adaptor member having an inner cavity communicated to said seats and opening into an outlet hole, said outlet hole being formed through a portion of said adaptor member which is to be fitted into a seat of the engine originally provided for receiving the gasoline injection device, said engine further comprising a distributing conduit or rail for feeding methane to all the methane injection devices.

In a first embodiment of said variant, for each cylinder of the engine there is provided an adaptor member including a first element in one piece, including said portion with the outlet hole and the seat of the gasoline injection device, and a second element including the seat for the methane injection device, located at a distance from the first element and connected thereto by a connecting tube which communicates the outlet hole of the first element to the seat of the methane injection device formed on the second element.

In a second embodiment, there is instead provided for each cylinder an adaptor member including said portion with the outlet hole and both said seats of the gasoline injection device and the methane injection device.

In the case of the above mentioned first embodiment, said second elements of the adaptor members associated with the various cylinders of the engine are connected to each other, either all together or in groups, into a structure including also a cavity acting as a distributing conduit or rail for feeding methane.

In the case instead of the second embodiment, said rail for feeding methane is constituted by an element separate from the adaptor members, each of which is connected thereto by a connecting tube.

In both embodiments, said connecting tubes are preferably hoses of rubber or the like, whose ends are fitted on cooperating nipples provided on the connected elements.

Due to said features, the engine according to the invention may be obtained by simple, rapid and unexpensive operations starting from a gasoline injection system.

BRIEF DESCRIPTION OF THE DRAWINGS

Further advantages of the invention will become apparent from the description which follows with reference to the annexed drawings, given purely by way of non limiting example, in which:

FIGS. 10, 11 are diagrams which show test results which demonstrate the advantages of the present invention.

DETAILED DESCRIPTION OF THE INVENTION

Figure 1:
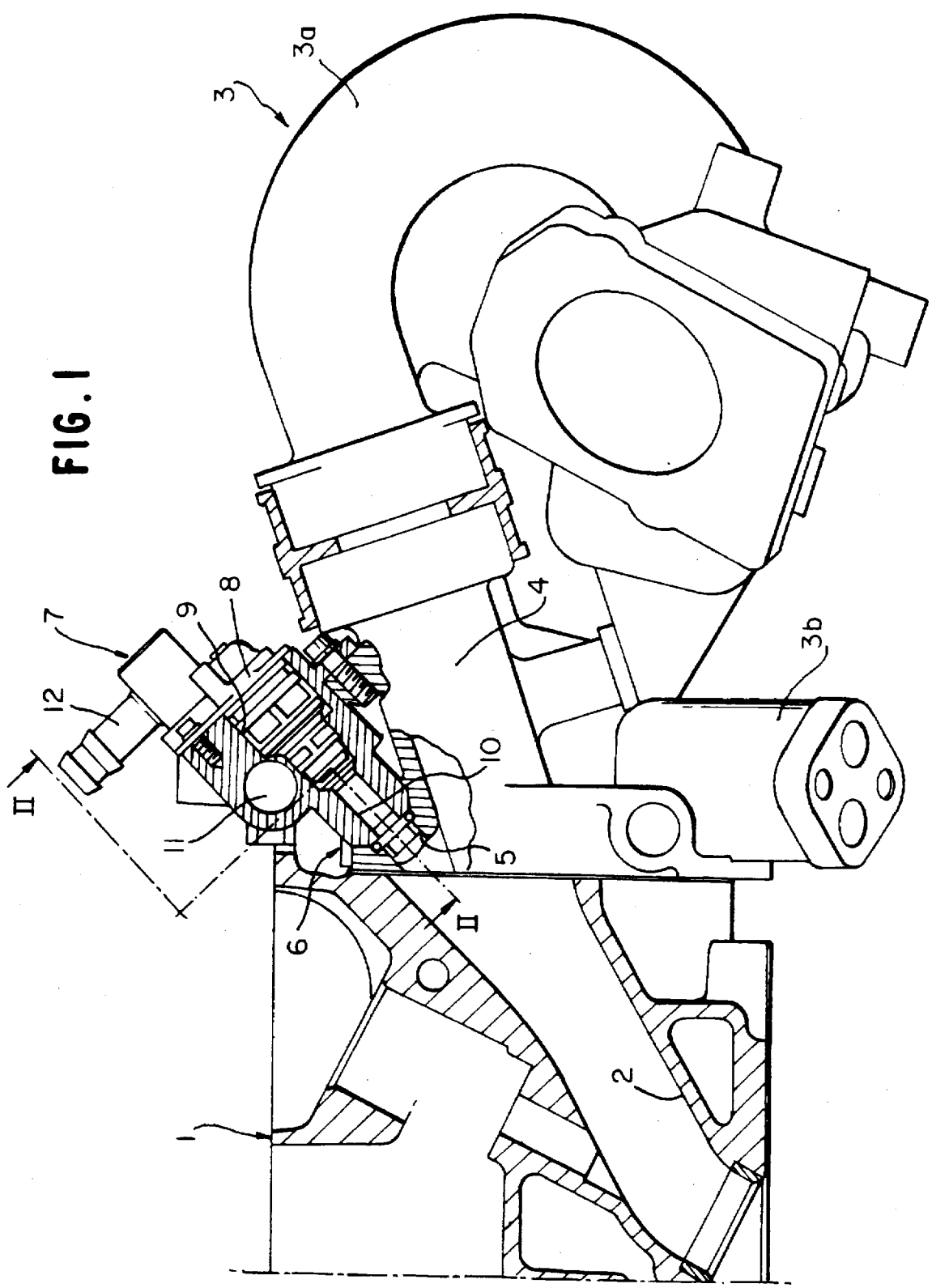
FIG. 1 is a cross-sectional view of a detail of an engine according to the invention with spark ignition and methane feed.
Figure 2:
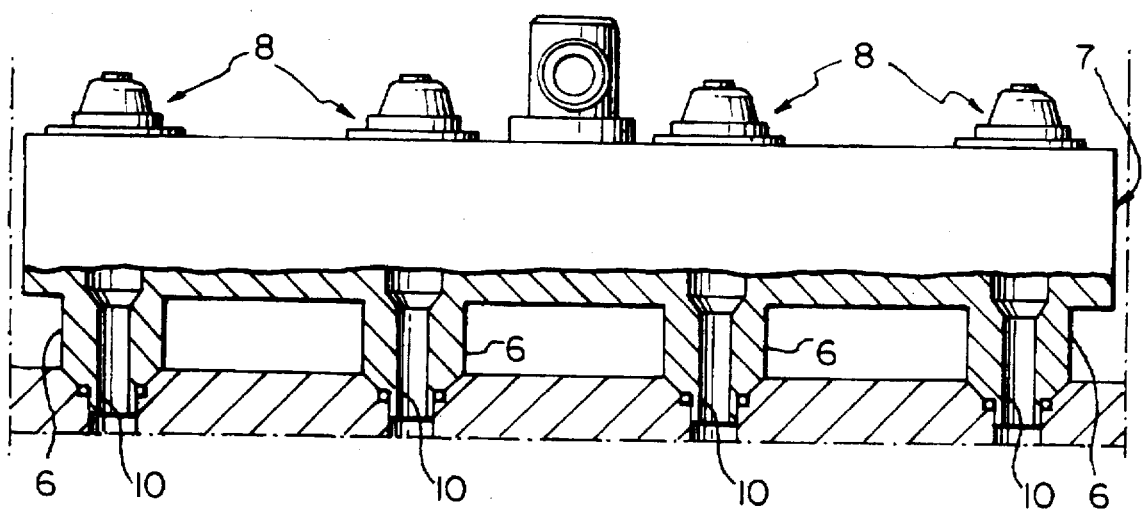
FIG. 2 is a cross-sectional view taken along line II—II of FIG. 1.

In FIG. 1, reference numeral 1 designates the head of an internal combustion engine originally provided for gasoline injection. Head 1 has a plurality of intake conduits 2 (only one of which is visible in the figure) respectively associated with the various cylinders of the engine. Reference numeral 3 generally designates the engine intake manifold, of a type known per se, which has a plurality of air feeding conduits 4 which are for communication to intake conduits 2 formed in the head. In the illustrated example, the manifold 3 is comprised of two bodies 3a, 3b connected to each other. Body 3b has a plurality of holes 5 respectively communicating to the intake conduits 2 which originally fulfil the function of seats for the gasoline injection devices.

According to the present invention, the seats 5 for the gasoline injection devices are instead used for receiving and locking a plurality of projections 6 of an auxiliary body 7 in which there are mounted the methane injection devices 8, these injection devices being of a size much greater than that of the gasoline injection devices.

As shown in FIG. 1, each injection device 8 is received into a seat 9 of the auxiliary body 7 which communicates to an outlet coaxial hole 10 for the methane which is formed through the respective projection 6 and communicates to the respective intake conduit 2. Seats 9 further all communicate to a distributing conduit or rail 11, which also is formed in the auxiliary body 7, for feeding the methane coming from an inlet nipple 12 to the seats 9. As clearly shown in the foregoing description, the use of the adaptor constituted by the auxiliary body 7 allows the methane injection devices 8 to be mounted with no modification to the structure of the intake manifold 3 and particularly with no modification to the seats 5 which are originally provided for the gasoline injection devices.

Figure 3:
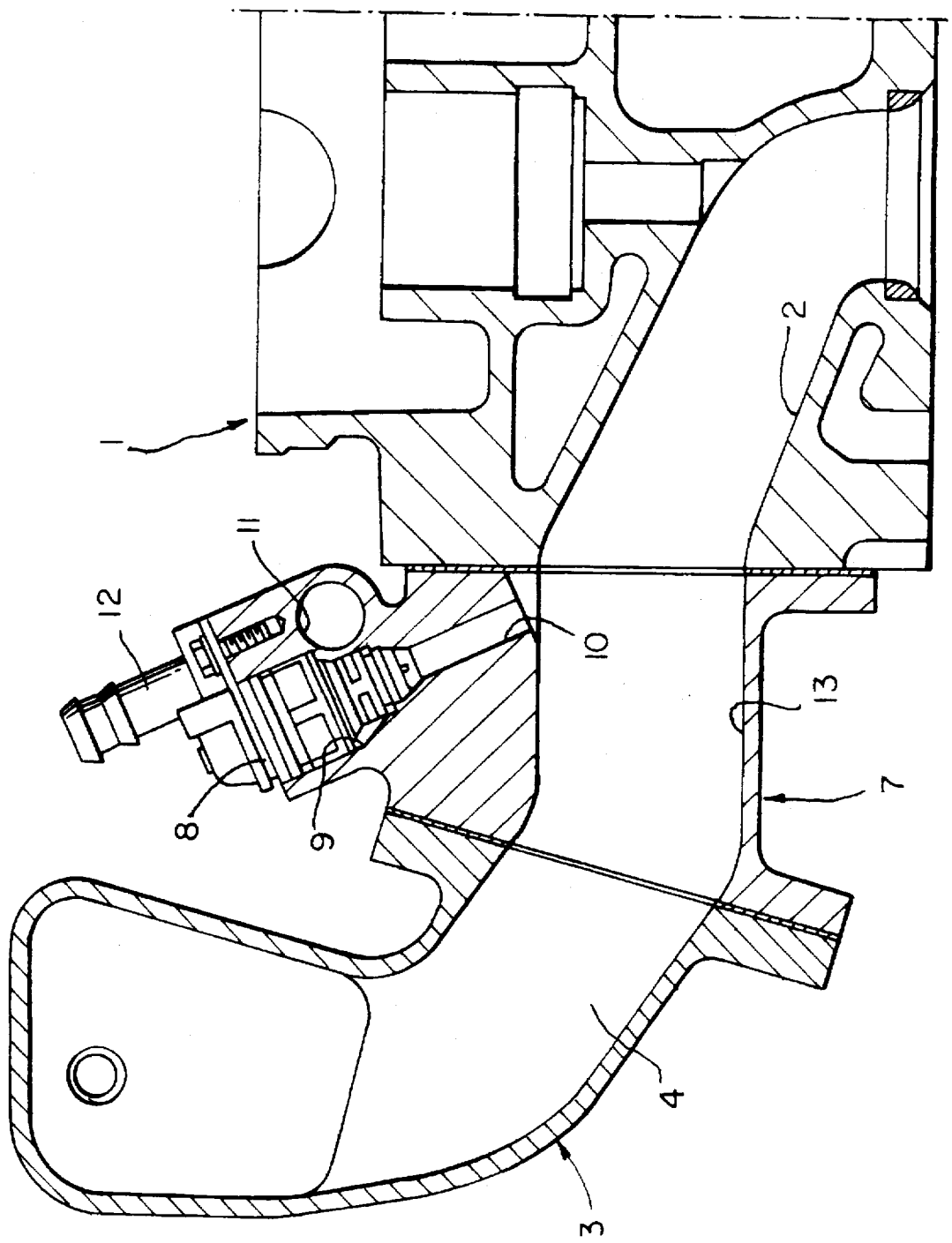
FIG. 3 is a cross-sectional view of a detail of a further engine according to the invention, of a diesel type, with methane feed.

FIG. 3 relates to the case of a diesel engine, also comprising a head 1 with intake conduits 2, communicated to corresponding conduits 4 of the intake manifold 3. In this case, the auxiliary body 7 is interposed between the intake manifold 3 and the head 2 and has conduits 13 for passage of the fed air which communicate conduits 4 of the intake manifold to the intake conduits 2 in the head i of the engine. Also in this case, the auxiliary body 7 further has seats 9 for the methane injection devices 8, communicating to the distributing conduit or rail 11 which receives methane from a nipple 12. Furthermore, also in this case seats 9 communicate to methane outlet holes 10 which open into conduits 13 for the passage of air formed in the auxiliary body 3. In this case, furthermore, the seats initially provided for the diesel fuel injection devices, formed in the cylinder head 1, are used for fitting ignition spark plugs (not shown).

As clearly apparent from the foregoing description, the invention allows a gasoline injection engine or a diesel engine preliminarly adapted with a spark ignition system to be transformed in a simple way into an engine with methane feed, provided with many methane injection devices associated with the various cylinders of the engine, with no modification to the structure and basic geometry of the engine.

Figure 4:
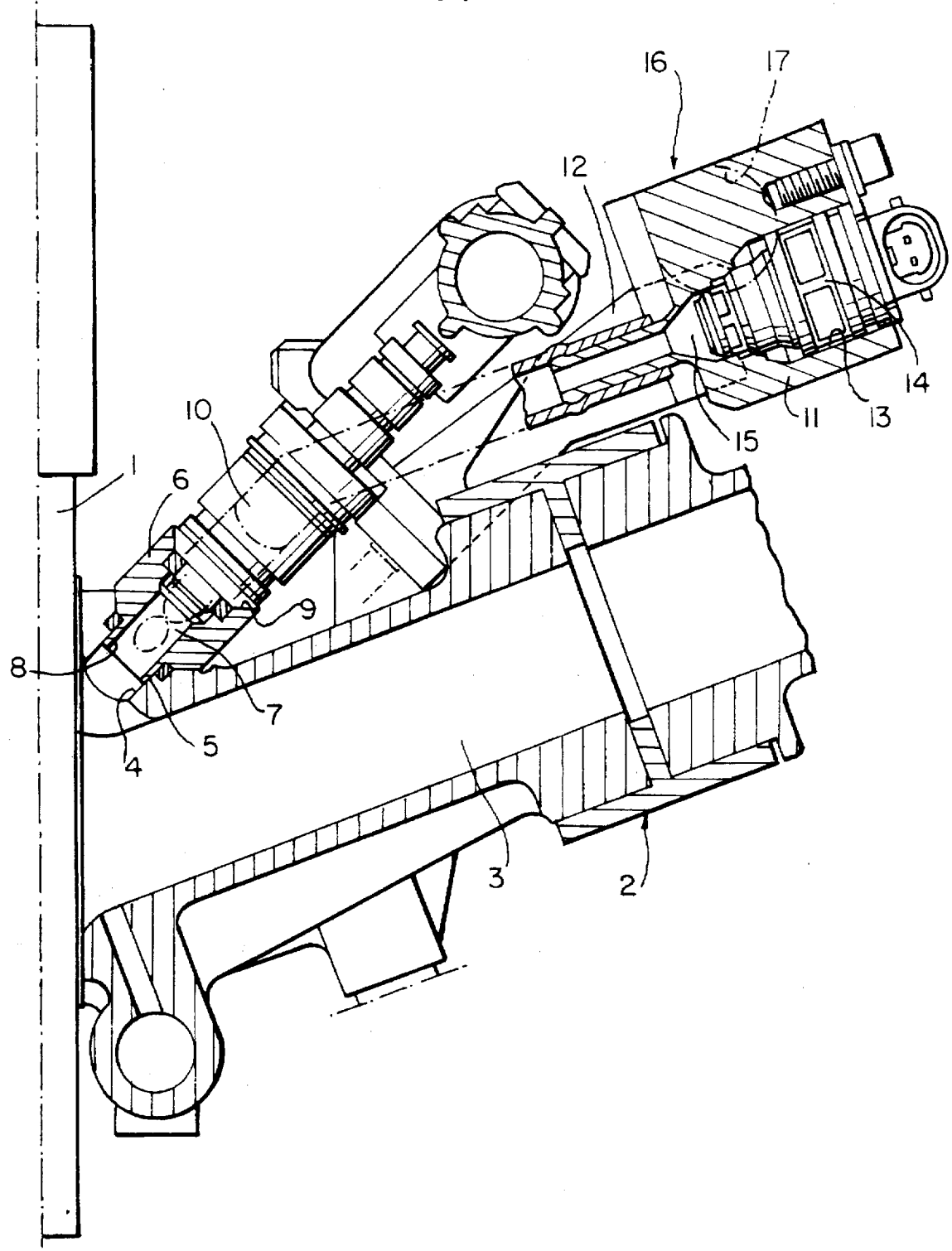
FIG. 4 is a cross-sectional view of a detail of the first embodiment of the variant of the engine of the invention adapted to operate either with gasoline or with methane.
Figure 5:
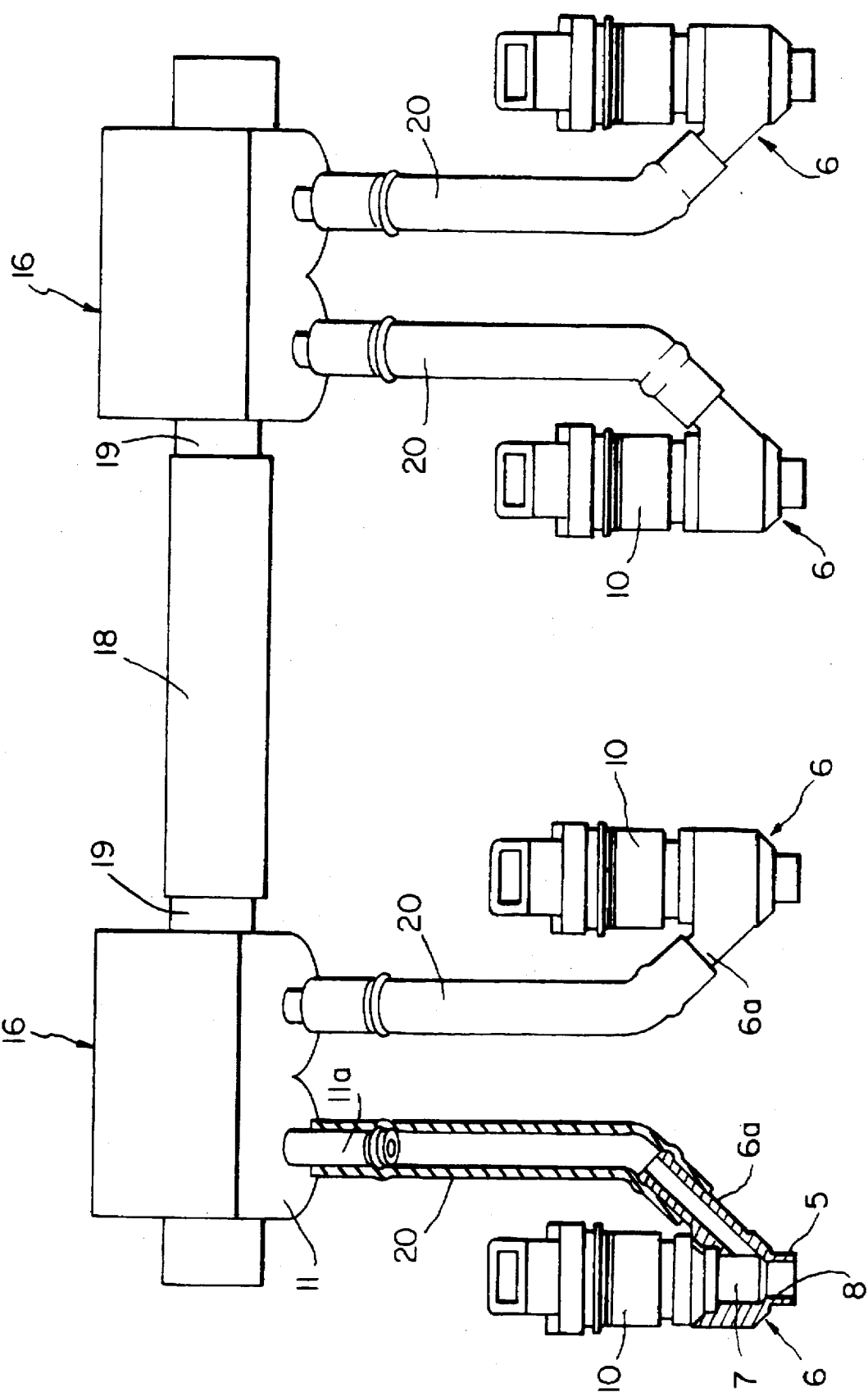
FIG. 5 is a front view of the detail of FIG. 4.

With reference to FIGS. 4, 5, numeral 1 designates the head of an internal combustion engine initially provided for gasoline injection. To the head 1 there is fixed an intake manifold 2 having a plurality of conduits 3 (only one of which is visible in FIG. 1) which are respectively for feeding air to the cylinders of the engine. At each conduit 3, the wall of the intake manifold has a hole 4 which originally constitutes the seat for the gasoline injection device.

In order to adapt within hole 4 both the gasoline injection device and a further methane injection device, in each hole 4 there is fitted a tubular portion 5 of an adaptor element 6 having a substantially cylindrical shaped body having an inner cavity 7 opening outside through an outlet hole 8 defined within portion 5.

The various adaptor elements 6 (FIG. 5) are thus mounted within corresponding seats 4 in lieu of the gasoline injection devices with which the engine is originally provided.

Still with reference to FIGS. 4, 5, the body of each adaptor element 6 has at its end opposite to the tubular portion 5, a seat 9, coaxial with the outlet hole 8, which receives the usual gasoline injection device 10. Therefore the latter is located with its axis coincident with that of hole 4, but in a position slightly displaced backwardly with respect to the conventional position in an engine operating with gasoline injection only.

With each cylinder of the engine there is also associated, in addition to the first adaptor element 6, a second adaptor element 11, whose body is separate and spaced apart from the first element 6 and supported by a bracket 12. For each engine cylinder, the respective second adaptor element 11 has a seat 13 for a cooperating methane injection device 14. Seat 13 communicates to an inner cavity 15 of element 11 which on its turn is communicated to the inner cavity 7 of the first element 6 through a hose of rubber or the like 20 whose ends are fitted on tubular nipples 6a, 11a, respectively, provided on the first adaptor element 6 and the second adaptor element 11.

In the case of the illustrated example (FIG. 5) the second adaptor elements 11 are associated two by two in a single body 16 which has an inner cavity 17 constituting a methane feed rail. The two inner conduits 17 of the two groups 16 are communicated to each other by a rubber hose 18 whose ends are fitted on nipples 19 projecting from structures 16. Naturally, it would be possible to provide a single structure including all the second adaptor elements 11, or yet, conversely, adaptor elements 11 all separate from each other. As shown, the position of each injection device 14 with respect to the outlet hole 8 is relatively spaced apart, but this does not imply any inconvenience, since the fuel fed is in a gaseous state and not in a liquid state, as in the case of gasoline.

Figure 6:
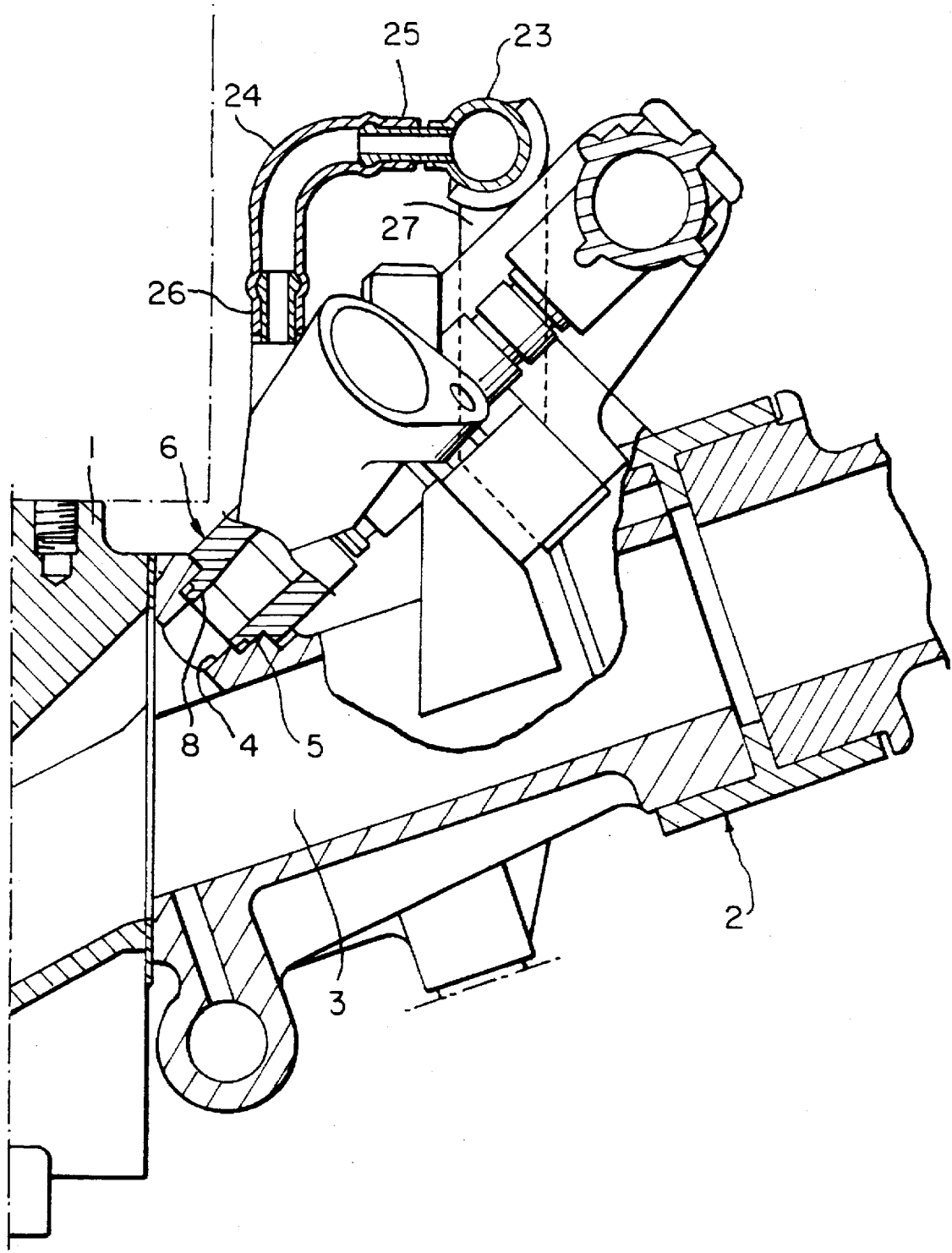
FIG. 6 shows a second embodiment of the variant of the invention.
Figure 7:
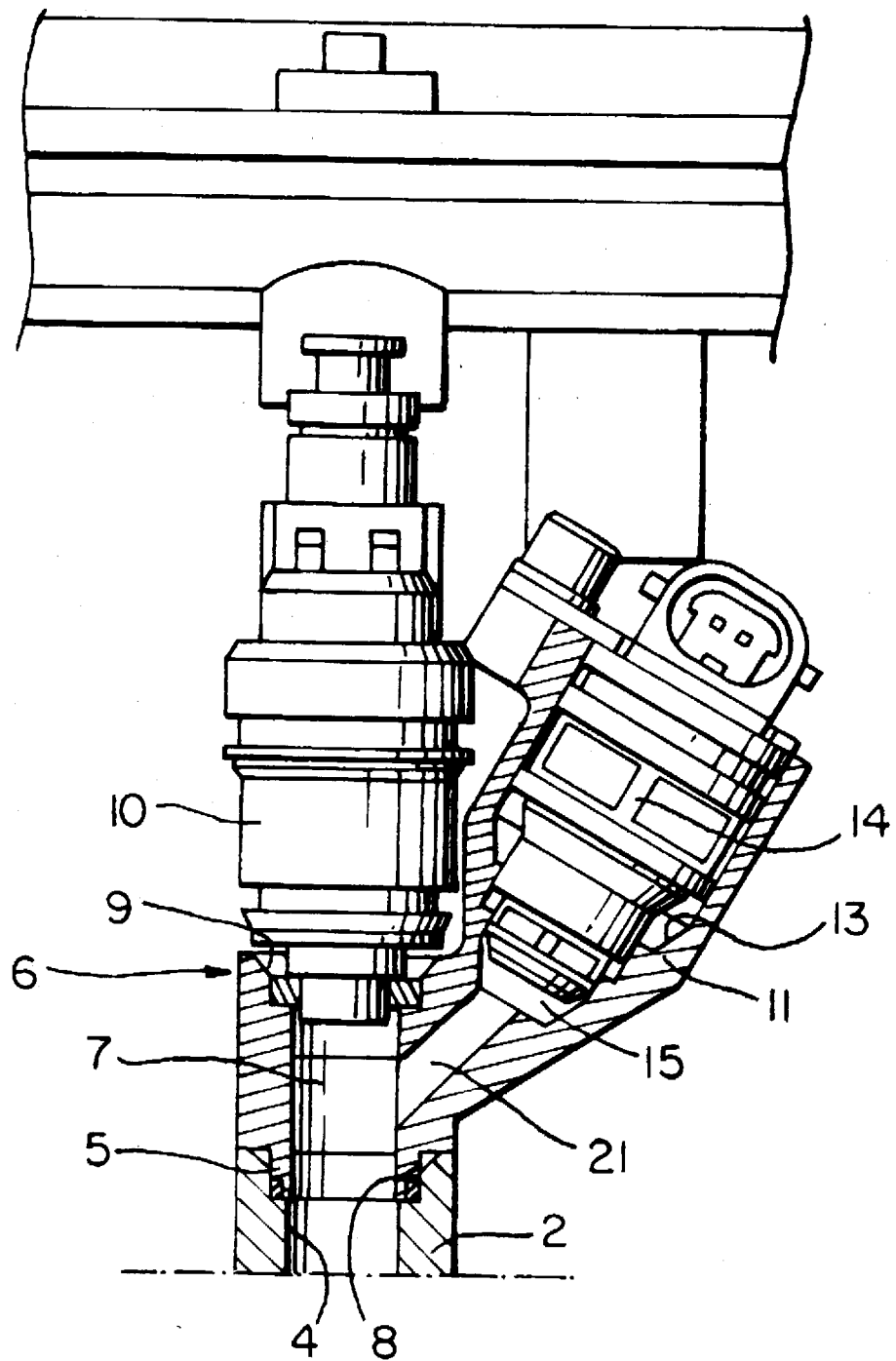
FIG. 7 is a cross-sectional view of the embodiment of FIG. 6.

FIGS. 6, 7 refer to a second embodiment in which the position of each methane injection device is less spaced from the outlet hole 8. In these figures, parts corresponding to those of FIGS. 4, 5 have been designated by the same reference numeral.

The main difference of the solution of FIGS. 6, 7 with respect to that of FIGS. 4, 5 lies in that in this case the two elements 6, 11 are included in a single piece, whose inner cavity 7 communicates with seat 15 of the methane injection device 14 through an inner conduit 21. Therefore, in this case with each cylinder there is associated an adaptor member 6, 11 separate from the others. The various adaptor members 6, 11 are communicated to a distributing conduit or rail 23 by respective rubber hoses 24 whose ends are fitted on nipples 25, 26 respectively formed on said rail 23 and the various elements 11. The rail 23 is constituted by an element separate from the adaptor members 6, 11 and supported by a bracket 27 (FIG. 6).

As clearly apparent from the foregoing description, the engine according to the invention, both in the embodiment shown in FIGS. 4, 5 and in the embodiment shown in FIGS. 6, 7, can be obtained by transforming with simple, rapid and unexpensive operations a gasoline injection engine and is able to operate selectively either with gasoline injection or with methane injection.

Figure 8:
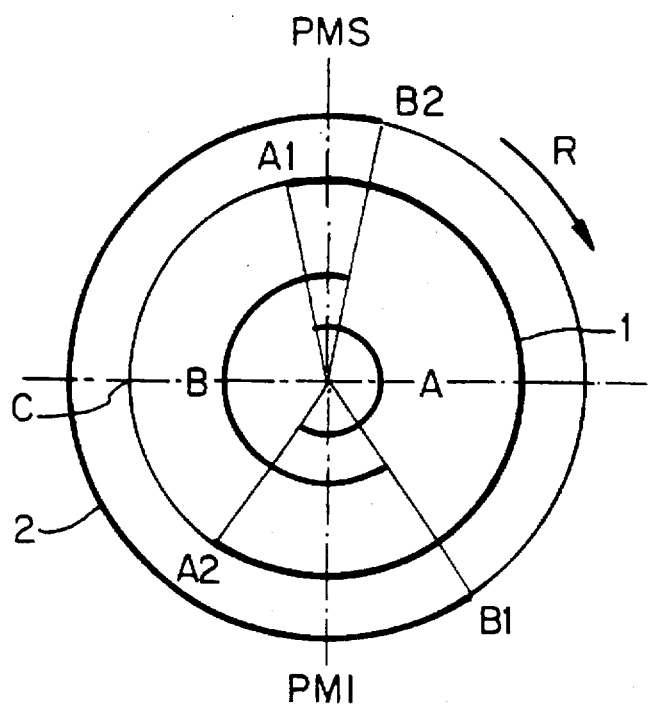
FIG. 8 shows a diagram of the intake and exhaust stages in a cylinder of an internal combustion engine with methane feed, controlled according to the principles which are at the basis of the present invention.

FIG. 8 is a diagram which shows the intake and exhaust stages in a cylinder of an internal combustion engine with methane feed, as a function of the rotational angle of the engine shaft. The arch designated by 1 relates to the rotation angular range of the engine shaft in which the cylinder intake valve is opened. Arrow R shows the direction of rotation of the engine shaft. As shown, the intake valve opens at an angular position A1, for example 2 degrees in advance with respect to the reaching of the top dead center (TDC) by the piston and ends at an angular position A2 which is delayed for example by about 42 degrees with respect to the reaching of the bottom dead center (BDC). Therefore the intake valve remains opened within an angular portion A of the rotation of the engine shaft.

The exhaust valve associated with the cylinder opens instead at a position B1, for example about 42 degrees in advance with respect to TDC and closes at B2, for example delayed by about 2 degrees with respect to TDC. Therefore, the exhaust valve remains opened through an angular portion B.

According to the invention, the methane injection device associated with a given cylinder of the engine is controlled to carry out the methane injection at the top dead center, i.e. when the intake valve is already opened. In this manner, the above indicated risk is avoided that the air/methane mixture enters into another cylinder of the engine with a resulting non uniform distribution of the mixture in the various cylinders. This way of operation is kept as long as the engine is at idling or anyhow has a rotational speed lower than a determined value, for example about 2500 rpm. Above this value, the injection is anticipated so that it is carried out in advance with respect to the opening of the intake valve. For example, at a rotational speed of 2700 rpm, the injection may be carried out at C (FIG. 8) i.e. 90 degrees in advance with respect to TDC. Above 5000 rpm, the injection may be carried out at BDC.

Figure 9:
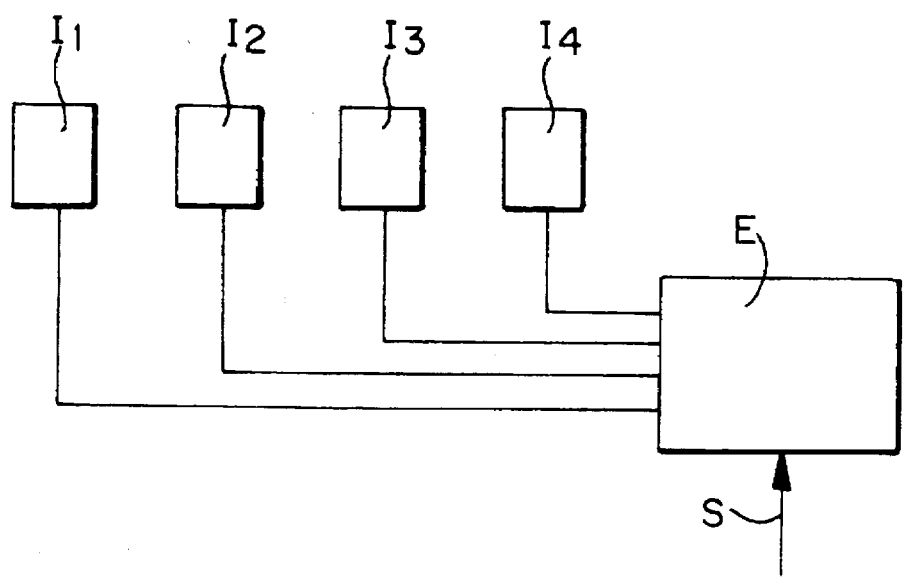
FIG. 9 shows a diagram of the motor according to the invention.

FIG. 9 diagrammatically shows the four methane injectors I1, I2, I3, I4 associated with the four cylinders of an internal combustion engine with methane feed. According to a technique known per se, the four injectors are controlled by an electronic control unit E as a function of signals S indicative of the parameters of operation of the engine.

According to the invention, the electronic control unit is programmed to carry out the injection into each cylinder following the opening of the respective intake valve. For example, as indicated above, the injection into each cylinder is carried out at the TDC. This way of operation is kept at least when the rotational speed of the engine is lower than a predetermined value, for example in the order of 2500 rpm. Above this speed, the beginning of the injection is anticipated, so that the injection is carried out when the intake valve is still closed.

Figure 10:
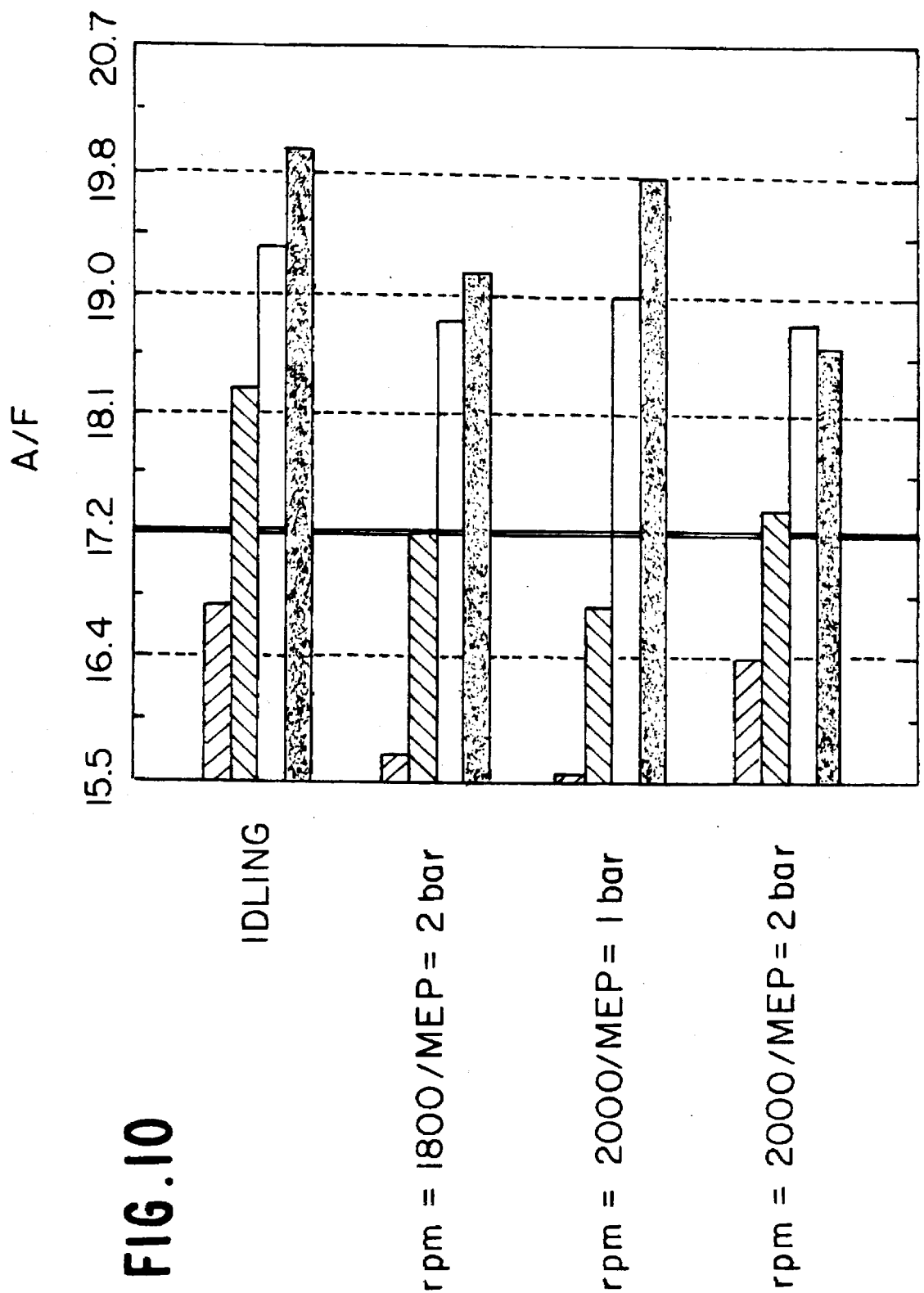

The diagrams of FIGS. 10, 11 show the advantages of the invention. The diagram of FIG. 10 shows the metering, i.e. the air/fuel ratio in the four cylinders of the engine, for various rotational speeds of the engine and for various mean effective pressures in the cylinders. As shown, for each condition of operation of the engine, four histograms are illustrated corresponding to the metering in the four cylinders of the engine.

As visible in FIG. 10, which relates to the case of a methane engine according to the conventional art, the distribution of the mixture in the four cylinders of the engine in different conditions is not uniform.

FIG. 11 shows the same diagram of FIG. 10 in the case of an engine according to the present invention. As shown, due to that the injection is carried out at each cylinder when the intake valve is already opened, the distribution of the air/methane mixture in the four cylinders of the engine is much more uniform with respect to the conventional solution.

In the present description, the details of construction relating to the methane feed system and particularly the injector devices as well as the electronic control system for the injection and particularly the electronic control unit E, are not shown, since said components may be provided in any known way and since these details, taken alone, do not fall within the scope of the present invention. Furthermore, the deletion of these details from the drawings renders the latter more easy to understand.

Naturally, while the principle of the invention remains the same, the details of construction and the embodiments may widely vary with respect to what has been described and illustrated purely by way of example, without departing from the scope of the present invention.

What is claimed is:

1. Internal combustion engine with a methane feed system having compression ignition, said system having a plurality of methane injection devices respectively associated with the various cylinders of the engine and mounted within respective seats communicating with a common distributing conduit or rail for feeding methane, and wherein the seats for the injection devices and said common distributing conduit are formed in an auxiliary body separate from the intake manifold and the head of the engine, said engine further comprising an electronic control unit which provides for controlling the injection devices on the basis of signals indicative of the parameters of operation of the engine, so as to carry out the injection of methane into each cylinder, at least when the rotational speed of the engine is lower than a predetermined threshold, with the intake valve of said cylinder already opened, and wherein said auxiliary body is interposed between the intake manifold and the engine head and conduits for passage of the air fed to the engine are formed through it, which communicate the cooperating conduits formed in the intake manifold and the engine head to each other, said auxiliary body further having a plurality of methane outlet holes which are aligned with said seats for the methane injection devices and respectively communicate with said conduit for passage of the air formed in the auxiliary body.

2. Internal combustion engine according to claim 1, wherein in each cylinder the injection is controlled by said control unit so as to take place at the TDC of the respective piston.

3. Internal combustion engine according to claim 1, wherein it comprises for each cylinder of the engine, an adaptor member provided both with a seat for a gasoline injector, and with a seat for a methane injector, said adaptor member having an inner cavity communicating with said seats and opening into an outlet hole, said outlet hole being formed through a portion of said adaptor member which is to be inserted into a seat of the engine originally provided for receiving the gasoline injection device, said device further comprising a distributing conduit or rail for feeding methane to all the methane injection devices.

4. Internal combustion engine according to claim 3, wherein for each cylinder of the engine there is provided an adaptor member including a first one-piece element, including said portion with the outlet hole and the seat of the gasoline injection device, and a second element including the seat for the methane injection device, located at a distance from the first element and connected thereto by a connecting tube which communicates the outlet hole of the first element to the seat of the methane injection device formed on the second element.

5. Internal combustion engine according to claim 3, wherein for each cylinder of the engine there is provided an adaptor member including said portion with the outlet hole and both said seats of the gasoline injection device and the methane injection device.

6. Internal combustion engine according to claim 4, wherein said second elements of the adaptor members associated with the various cylinders of the engine are formed, either all together or in groups, in a single structure including also a cavity acting as a distributing conduit or rail for feeding methane.

7. Internal combustion engine according to claim 5, wherein said distributing conduit or rail for feeding methane is constituted by an element separate from the adaptor members, each of which is connected thereto by a connecting tube.

8. Internal combustion engine according to claim 4, wherein each connecting tube is a hose of rubber or the like, whose ends are fitted on cooperating nipples provided on the connected elements.

9. Internal combustion engine according to claim 7, wherein each connecting tube is a hose of rubber or the like, whose ends are fitted on cooperating nipples provided on the connected elements.

* * * * *